United States Patent
Pilgrim (10) Patent No.: US 12,452,502 B2
(45) Date of Patent: Oct. 21, 2025

(54) DUAL-BAND PANORAMIC CAMERA SYSTEM

(71) Applicant: Bob Pilgrim, Benton, KY (US)

(72) Inventor: Bob Pilgrim, Benton, KY (US)

( * ) Notice: Subject to any disclaimer, the term of this patent is extended or adjusted under 35 U.S.C. 154(b) by 0 days.

(21) Appl. No.: 18/626,246

(22) Filed: Apr. 3, 2024

(65) Prior Publication Data

US 2024/0388773 A1  Nov. 21, 2024

Related U.S. Application Data

(60) Provisional application No. 63/467,572, filed on May 18, 2023.

(51) Int. Cl.
| | |
|---|---|
| H04N 23/11 | (2023.01) |
| G01J 3/02 | (2006.01) |
| G01J 3/28 | (2006.01) |
| G01J 5/00 | (2022.01) |
| H04N 23/55 | (2023.01) |

(52) U.S. Cl.
CPC .............. *H04N 23/11* (2023.01); *G01J 3/021* (2013.01); *G01J 3/2823* (2013.01); *H04N 23/55* (2023.01); *G01J 2005/0077* (2013.01)

(58) Field of Classification Search
CPC ........ H04N 23/11; H04N 23/55; H04N 23/58; G01J 3/021; G01J 3/2823; G01J 2005/0077
See application file for complete search history.

(56) References Cited

U.S. PATENT DOCUMENTS

| | | | | |
|---|---|---|---|---|
| 2003/0007793 A1* | 1/2003 | Suzuki | .................. | G03B 37/02 396/20 |
| 2006/0023105 A1* | 2/2006 | Kostrzewski | ............. | G06T 5/80 348/335 |
| 2008/0247061 A1* | 10/2008 | Simkulet | ............... | G02B 13/06 359/857 |
| 2009/0073254 A1* | 3/2009 | Li | .......................... | H04N 23/63 348/36 |
| 2018/0143417 A1* | 5/2018 | Ueda | ...................... | G02B 7/182 |
| 2018/0249910 A1* | 9/2018 | Zhang | ................. | A61B 5/0082 |

FOREIGN PATENT DOCUMENTS

CN  108008597 A  *  5/2018  ............. G03B 11/04

* cited by examiner

*Primary Examiner* — Michael Lee
(74) *Attorney, Agent, or Firm* — Chris Tanner; BlueCollarIP.com (57) ABSTRACT

A dual passband imaging system and method of assembly, use, and construction is disclosed. The imaging system locates a visible spectrum camera inside a parabolic mirror so as to be looking through a center hole within a flat mirror, and also locates a thermal spectrum camera to view the parabolic reflector through the center hole. A parabolic reflector is arranged to direct the exact same image-data toward the thermal spectrum camera and the visible spectrum camera.

15 Claims, 8 Drawing Sheets

FIG. 1A

FIG. 1C
(non-FLIR embodiments)

DUAL-BAND PANORAMIC CAMERA SYSTEM

BACKGROUND OF THE INVENTION

Machine vision camera systems are known to improve object recognition by combining images in different spectral bands. When the target and/or the sensor platform are moving, it is important to synchronize the imagery being collected in both time and viewing aspect.

Some machine vision systems that combine images from different passbands e.g. visible (VIS) and thermal, as well as hyperspectral cameras that extract information through algorithmic manipulations (band ratios, weighted averages, differences, etc). These systems visually align the images but do not real-time synchronize (e.g. at the time the images are collected). Further, even when the images are collected concurrently, the shutters (either rolling or global) sweeping the scenes are typically not in phase. The most important limitation for a multiple camera system is that the viewing aspects of the different cameras are slightly different.

Over the last two decades advances in multiband object detection, recognition and identification have accelerated. During this time various designs of focal planes and optical devices could simultaneously collect visible/NIR and thermal imagery. Further, machine vision and AI algorithms have been developed to take advantage of this multiple band imagery. Additionally, significant advances have been reported in medical diagnostics, remote sensing for environmental analysis, precision agriculture and military applications.

While demonstrating the value of multiple-band sensing, the physical layout of these imaging systems have limitations. Mechanical scanning systems cannot continuously view the region of interest. Side-by-side panoramic sensors have different viewing aspects that can miss important details of dynamic objects. For example, reflected visible and thermal flashes are extremely short-lived, and their synchronized viewing depends on precise alignment of the imagers optical paths. Some systems tried using dichroic beamsplitters to separate the incoming visible and thermal, directing the energy to the respective visible and thermal focal planes. Unfortunately, this resulted in energy loss at the beamsplitter, and the overall mechanical structure is fragile and better suited to a laboratory than a battlefield.

These known reflective multiple-band systems are not panoramic, and require several reflective optical elements to separate the visible and thermal information. They also locate the respective focal planes next to each other, resulting in aspect-differences similar to those produced by the dual-camera side-by-side systems.

Below is a non-limiting summary of some conventional multi-camera systems.
- PTZ Scanning Systems—do not provide continuous panoramic view;
- Multi-Camera Systems—have large size, weight and power (SWaP) and communication bandwidth requirements; and
- Fisheye/Panoramic—need separate lens systems for VIS (visual spectrum) cameras and Thermal cameras.

From the above, it is apparent that an improved arrangement is desired.

SUMMARY OF THE INVENTION

An imaging system combines visible and thermal images using the same reflective, optical system along the same line of sight, thereby producing two images with the exact same viewing aspect. In addition, the visible and thermal camera focal plane and electronics are precisely synchronized so that rapidly moving or changing objects are observed at exactly the same time and along exactly the same aspect. This capability is particularly valuable with viewing heavily textured and porous surfaces, as well as complex shaped objects whose viewed aspect is rapidly changing. This feature is sometimes referred to as multispectral spatiotemporal simultaneity (MSS). Combining such data enhances the ability to identify objects at a higher level of specificity than current MV\AI methods.

The system 100 combines a simultaneous output of visible and thermal image processors within a unified arrangement, where both spectral-images are taken along the exact same line of sight. This results in producing two images with the same viewing aspect. In addition, both visible focal plane $208_{VIS}$ and thermal focal plane $208_{FLIR}$ and their electronics can be precisely synchronized so that rapidly moving or changing objects are observed at exactly the same time and along exactly the same aspect. This capability is particularly valuable with viewing heavily textured and porous surfaces, as well as complex shaped objects whose viewed aspect is rapidly changing. This effect is known as multispectral spatiotemporal simultaneity (MSS). Combining such data produces an ability to identify objects at a higher level of specificity than current machine vision and AI methods.

In other alt-embodiments the particular sensors sharing the same optical system 100 can be changed to use e.g. LIDARs, SWIR, Laser Spectral Imagers, and/or bidirectional reflectance sensors. The embodiments herein invention enables the collection of multiple-band data from very narrow viewing lines of sight and very short-lived phenomena The expression "short-lived" refers to momentary visible/thermal data that is valuable to a recognition process, but difficult to capture. Such recognition is aided by the embodiments herein due to their continuously seeing an entire viewing area both visible and thermal passbands.

As such, the various system(s) 100 described herein provide a capability for continuous viewing of an entire surrounding scene in both passbands, with no loss in incoming signal levels. This applies to all styles of focal-plane synchronization, which is an important advantageous characteristic, and resolves a temporal\timing issue.

Earlier embodiments view the surrounding scene along the same lines of sight but through a beam-splitter that reduces amount of signal getting to both sensors. This signal loss reduces effectiveness. In sharp contrast, the embodiments herein facilitate continuous 360 degree viewing in both visible and thermal passbands. This includes full visible and full thermal focal planes $208_{VIS}$ $208_{FLIR}$ thereby leading to simultaneous viewing in both bands along the same line of sight.

DETAILED DESCRIPTION OF PREFERRED EMBODIMENTS

Acronym List

AI/ML==Artificial Intelligence/Machine Learning
ATR==Automatic Target Recognition
CCD==Charge-Coupled Device
COTS==Commercial Off The Shelf
FLIR==Forward Looking InfraRed
FPA==Focal Plane Array
LIDAR==Light Detection and Range
LWIR==Long Wave InfraRed spectrum
MSS==Multispectral Spatiotemporal Simultaneity
MV==Machine Vision
NIR==Near-InfraRed spectrum
PTZ==Pan, Tilt, & Zoom
SWIR==Short Wavelength InfraRed
SWaP==Size, Weight, and Power
VIS==visual spectrum

Word-Semantics

Within this disclosure, the expression "camera" should be read to mean close to the same thing as "imager". In order to conform with conventional word-usage, it sometimes makes more sense to use one word instead of the other, as they may have slightly different meanings for the reader. But in this disclosure, they connote the same concept for the most part.

Figure 1A:
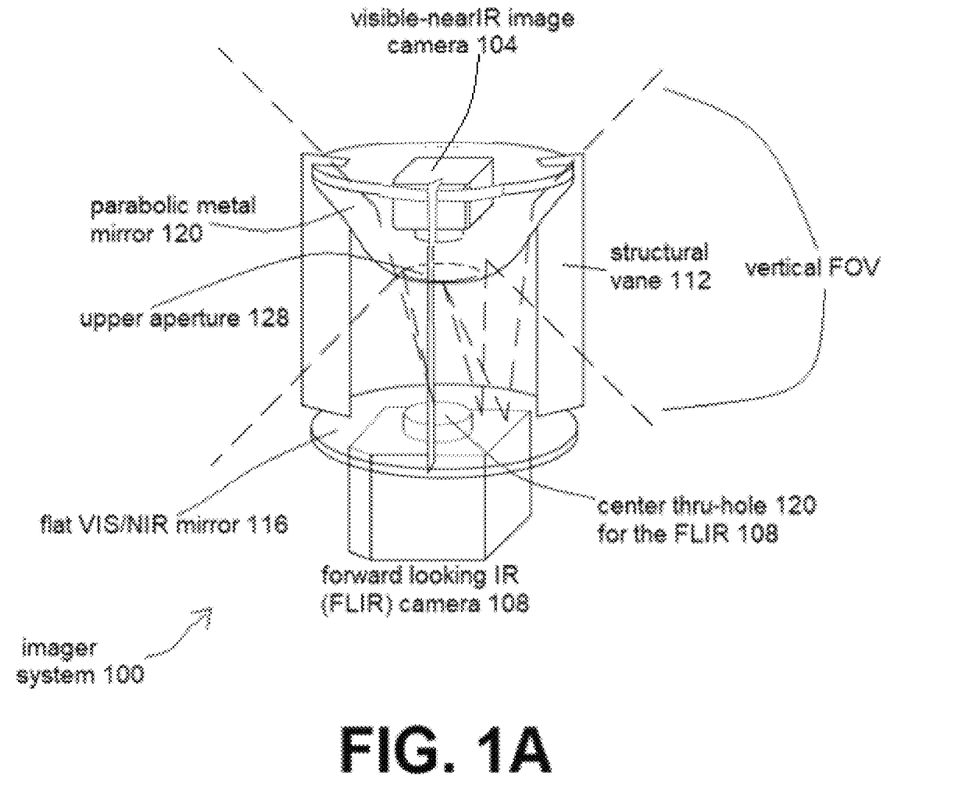
FIG. 1A shows an exemplary arrangement of a system according to the embodiments herein.

As shown in FIG. 1A, one way to configure the system 100 is to locate the visible spectrum camera 104 inside the parabolic mirror 120, so as to be looking through the center hole 124 at the flat mirror 116. This provides a view of the same parabolic reflector 120. Meanwhile, simultaneously, the thermal camera (FLIR) 108 views the parabolic reflector 120 through the same hole 124 in the flat reflecting mirror 116. In FIG. 1A the parabolic reflector 120 is used to direct an image toward the FLIR (thermal) camera 108. The reflecting mirror 116 can be an ambient temperature mirror 116, and thus would not require a cryogenic cooler. This feature reduces power requirements and weight. In an embodiment, the reflecting mirror 116 is made from aluminum, a chrome-plated substrate, or some other metal-based material that has low emissivity.

In FIG. 1A the parabolic mirror 120 is used to direct the thermal image toward a FLIR or thermal camera 108. Meanwhile, the visible-spectrum camera 104 is placed inside the parabolic mirror 104 looking through the center hole at a flat mirror positioned to provide a view of the same parabolic reflector 120. The thermal camera 108 views the parabolic reflector 120 through the hole in the flat mirror 116.

The proprietary shape of the convex parabolic reflector 120 is chosen and structured to reduce the computational complexity of the de-warping software which converts the annular image 212 into a strip image 224. An embodiment results in 360 degree horizontal coverage but the same method can be applied to any field-of-view optical system.

Moving onto the structural vanes 112, these act to hold the mirror 116 in place. They are thinner than the optical aperture so the cameras 104/108 can see around them.

Another feature of the vanes 112 is they can be sized and positioned to work with one or more parabolic reflectors 120. Meanwhile, as stated above, another set of one or more vanes 112 can be sized and positioned to work with one or more flat mirrors 116.

Further, it is advantageous to ensure that a projected obscuration is narrower than the apertures within the cameras 104/108. Still further, the above sizing, positioning, and ensuring facilitates the cameras 104/108 "see" (have unobstructed views) around the various structural vanes 112. By arranging the vanes 112 within the system(s) 100 this way, the useful viewing regions can be unobstructed. The parabolic mirror 120 is thus supported by structural window connecting the upper and lower portions of the system 100. That structural window is transparent to both visible and thermal spectral energy.

Figure 1B:
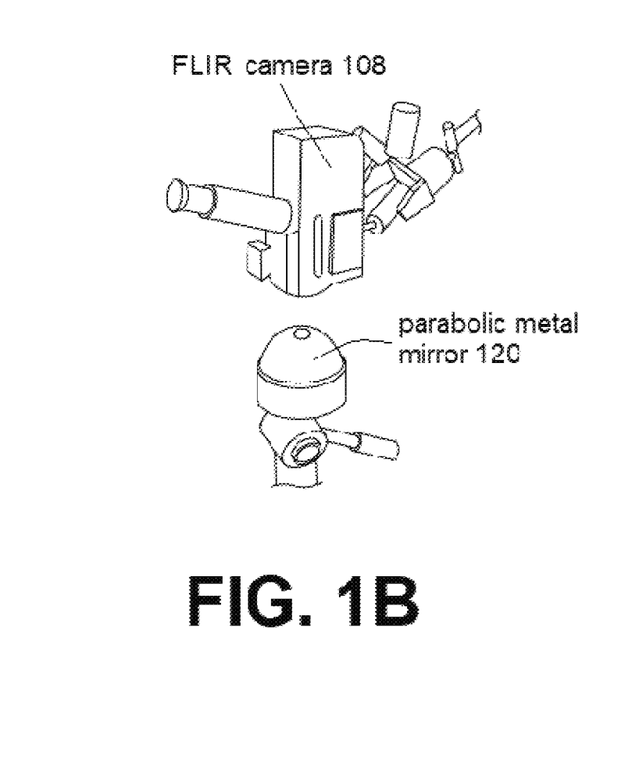
FIGS. 1B-1C shown alt-embodiments of systems also according to the embodiments herein.
Figure 1C:
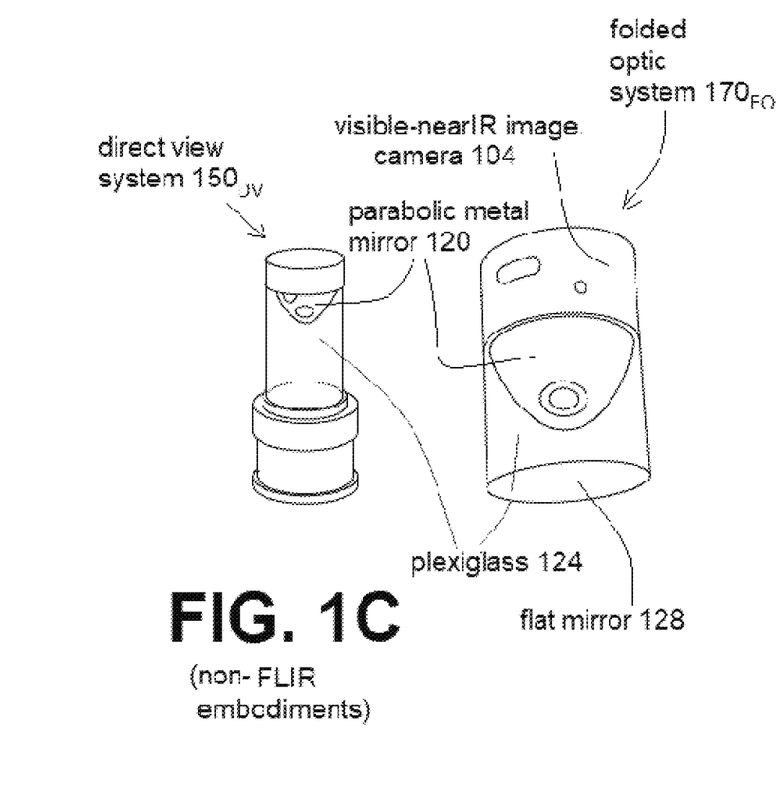

Several versions of the embodiments herein exist, as shown at least within FIGS. 1B-1C. These comprise a direct view system $150_{DV}$ where the camera 104 is placed facing the parabolic reflector 120; and a folded optics system $170_{FO}$, where the image is placed inside the convex parabolic reflector 120 and views that reflector 120 through an aperture at a flat mirror 116 placed in front of the camera 104. Neither the direct view system $150_{DV}$ nor the folded optics system $170_{FO}$ use any FLIR devices, and are strictly visible spectrum systems.

FIGS. 2A-2E shows example annular-images 212 and their associated strip-images 224. Conversion of the annular image into a rectified strip image 224 is accomplished in a software-based sampling operation that in an embodiment may include de-warping. The parabolic reflector 120 causes a change in linear scale in a vertical direction, thereby reducing processing steps in the transformation from the annular image 212 to the strip image 224.

Some example results of this conversion are shown in FIGS. 2A-2E. On the LH side are the annular images 212 being collected at both visible and thermal focal planes. On the RH side are these same images, shown in a 360° context sometimes referred to as panoramic, rectified, or de-warped "strip" images 224. For the purpose of patent drawings, which cannot convey 360° circular-panoramic information, the view of FIGS. 2A-2E should imagine the 2D rectangular strip images 224 as surrounding the user in a 3D (360°) context.

The left side (smaller, square) side of FIGS. 2A-2D shows the annular images being collected at the visible and thermal focal planes 208. FIG. 2E does not have a smaller, square LH version.

Figure 2A:
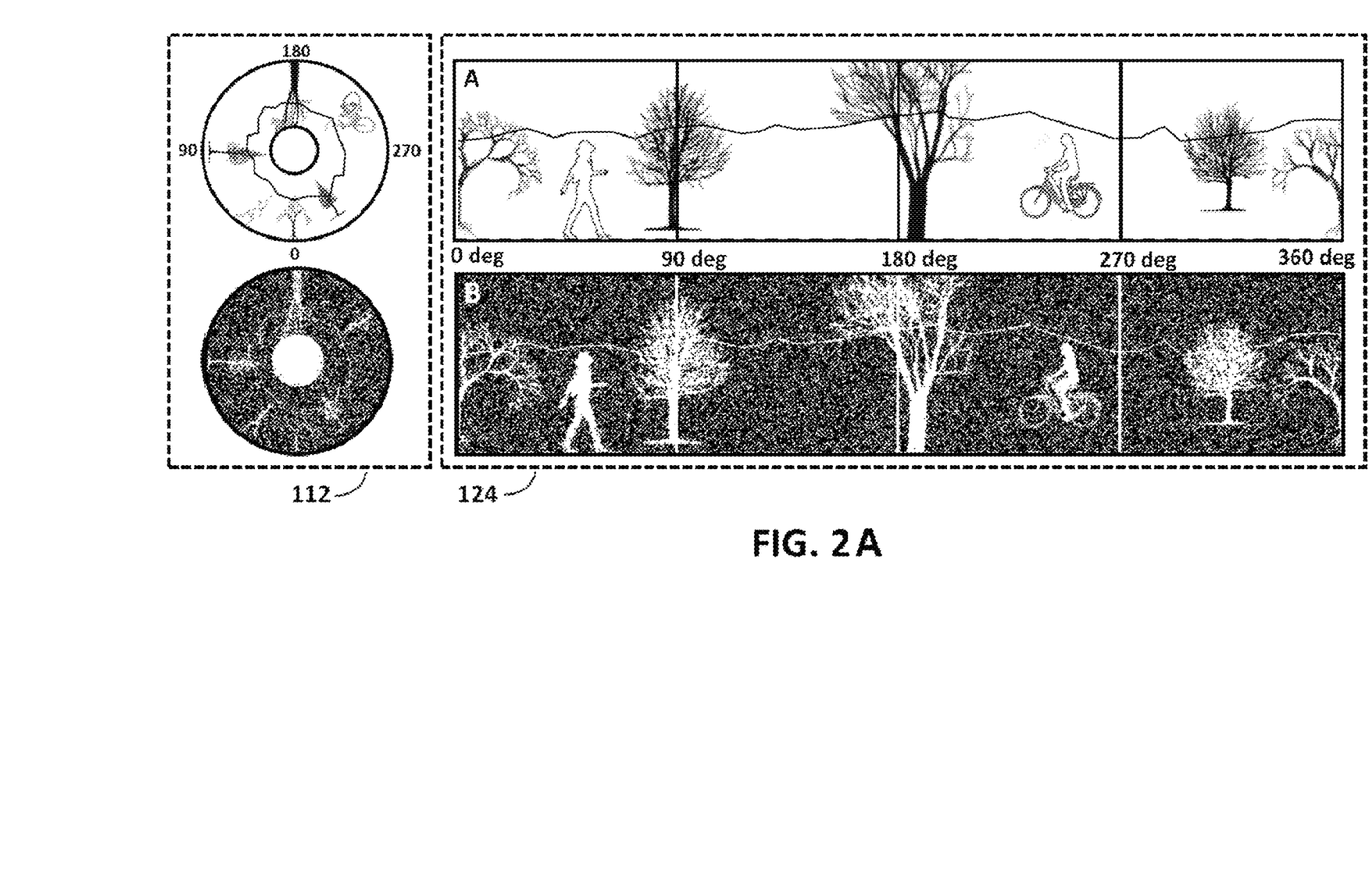
FIGS. 2A and 2B show example annular-images and their associated strip-images.
Figure 2B:
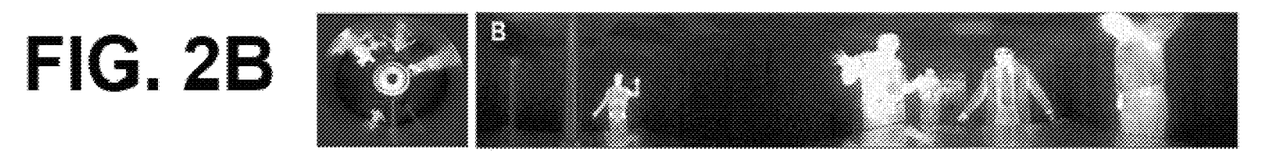
Figure 2C:
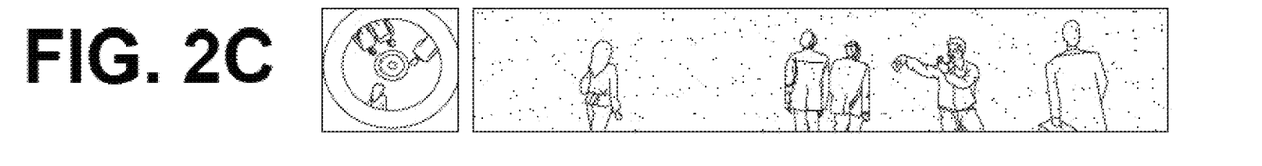
FIG. 2C shows the ability to view the parabolic mirror in a folded optical design.
Figure 2D:
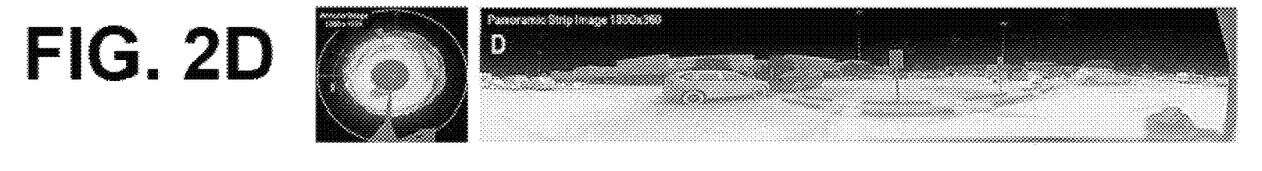
FIGS. 2D and 2E are screenshots from a high-resolution thermal imager.
Figure 2E:
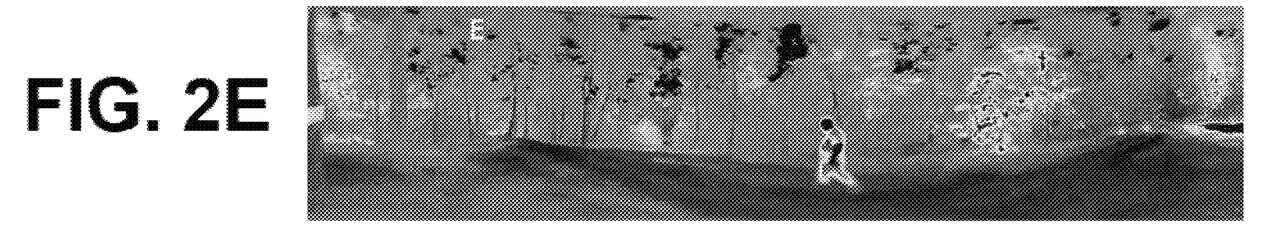

FIGS. 2A-2D (the right side) are the resulting 360 degree camera-pan versions, shown in 2 dimensional rectangles only for purpose of this patent disclosure, after a de-warping process. FIG. 2A shows the initial proof of concept for image rectification through software. FIG. 2B demonstrates the effective use of an ambient temperature mirror to collect panoramic images. FIG. 2C shows the ability to view the parabolic mirror in a folded optical design. FIGS. 2D and 2E are screenshots from a high-resolution thermal imager. FIG. 3 follows from the above, but where the upper is visible-spectrum, and the lower is non-visible spectrum thermal energy sources of light and heat.

Figure 2F:
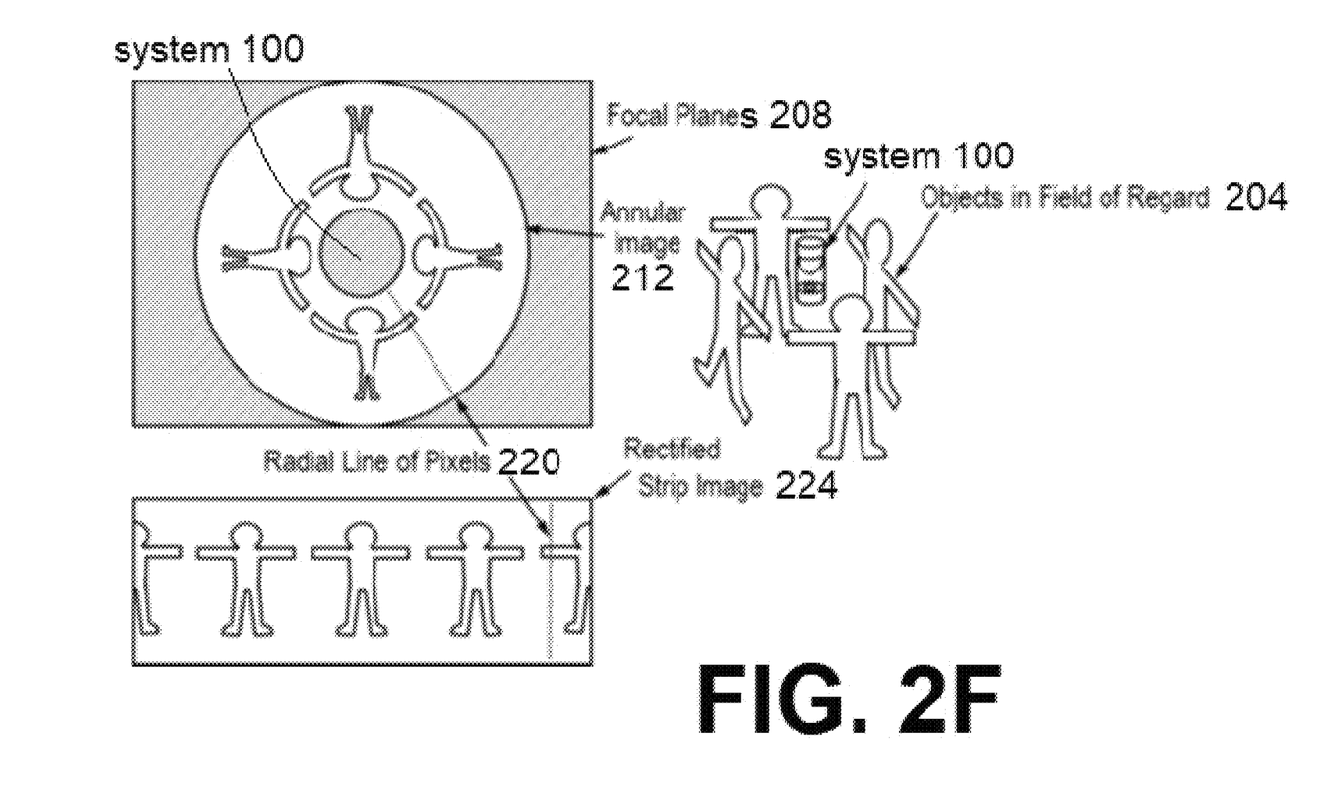
FIG. 2F shows an example usage of the system.

FIG. 2F shows an example usage of the system 100 having the following elements: objects in the field of regard, two focal planes $208_{VIS}$ and $208_{FLIR}$ an annular image 212, the system 100, a radial line of pixels 220, and a rectified (de-warped) strip image 224. The radial line of pixels 220 helps show a relationship between the annular image 212 and the rectified (de-warped) strip image 224. In this disclosure, the expression "rectified" will have the same meaning as de-warped, as in being subject to de-warping software.

Within the embodiments herein, it is possible to combine MSS with AI concepts. An MSS data stream feeding an AI/ML recognition system increases a level of contextual knowledge which increases the specificity of situational awareness. The below table shows some specific examples of MSS/AI combos facilitated by the various embodiments of system(s) 100 described herein.

|  | Aircraft | Vehicle | Container | Building | Camo Cover |
| --- | --- | --- | --- | --- | --- |
| Visible Only | Identity | Make/Model | Type | Location | Location |
| LWIR Only | Recent Activity | Path Traveled | Contents Activity | Heated | Activity Location |
| MSS | Crew Position, Engine Speed | Fuel Status | Type of Activity | Occupied vs Vacant | Manufacturer Source of Camo |

These higher levels of contextual knowledge about an opponent, opponent's equipment, and opponent's activity can help provide advantages against that opponent.

EMBODIMENTS/APPLICATIONS

The imager system 100 and its field of view (FOV) is designed to take maximal advantage of the focal plane 208 (i.e. to make use of the greatest number of pixels). The location of the dual passband system 100 can be placed to be out of sight thereby (1) providing a safe location from tampering/theft; (2) protections from a hostile environment; and (3) valuable for achieving covert surveillance.

The metallic parabolic reflector 120 can be any size and shape and the de-warping software is helpful in producing rectified images. Further, multiple imagers can view the same parabolic metal reflector 120 from plural locations. In this case the different locations of imager system 100 would provide different viewing aspects of the same scene or different scenes.

This single-imager per panoramic view concept described herein is becoming more practical as the commercially available pixel-counts within the focal planes 208 within CCDs and CMOS increase. There are high resolution FPAs used in astronomy and upscale photography. A target threshold for the embodiments herein is 10,000×10,000 pixels. Currently there exist COTS versions of cameras/imagers having 4000+×4000+FPAs.

The ability to view panoramic images in a thermal passband from such an uncooled metal parabolic mirror 116 has been demonstrated using, for example, resources such as a Viento 1280 bolometer. As shown in FIG. 2F, the annular (circular) image 112 from the cameras 104\108 is converted into a rectified string (strip) image 224 using the de-warping software matching the parabolic mirror. The de-warping software enables the system(s) 100 to achieve a higher number of frames per second, thus improving the quality of the video and collecting more data for object recognition and tracking.

Figure 3A:
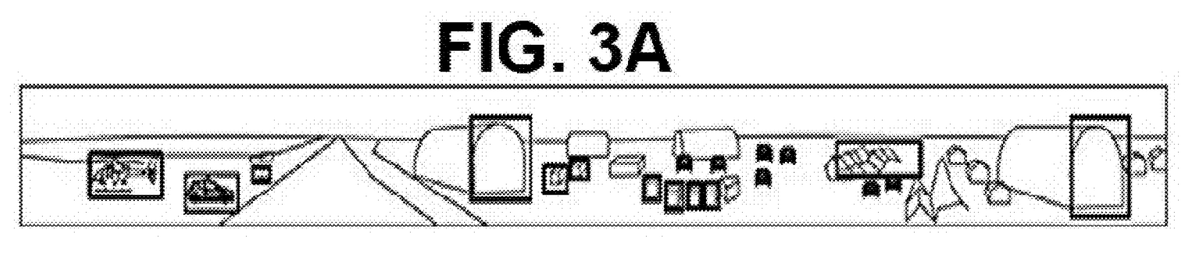
FIGS. 3A-3B show some potential trouble-spots in the format of strip-images.
Figure 3B:
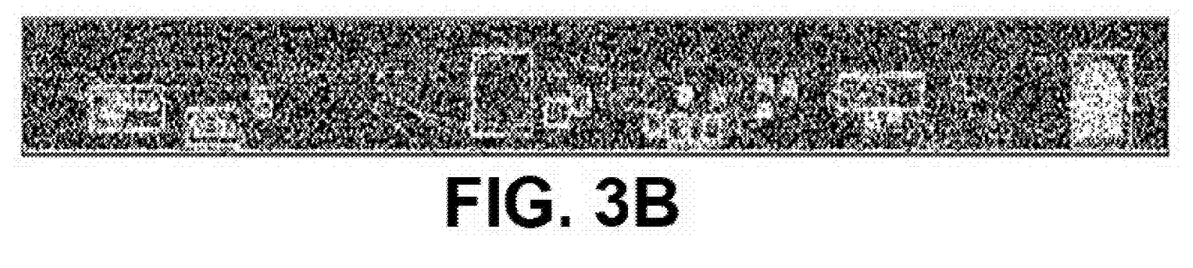

FIGS. 3A-3B show some potential trouble spots in the format of strip-images 224. Because IR images are difficult to show in a patent-friendly context, FIG. 3B has attempted to emulate the darkness-aspects of an IR heat-recognition image, and in doing so showing potential hot spots. Meanwhile, FIG. 3A is a normal representation of that same military region. It is important to note the difference between a hot spot (heat map) and a trouble spot (location subject to warfare activity).

Figure 4:
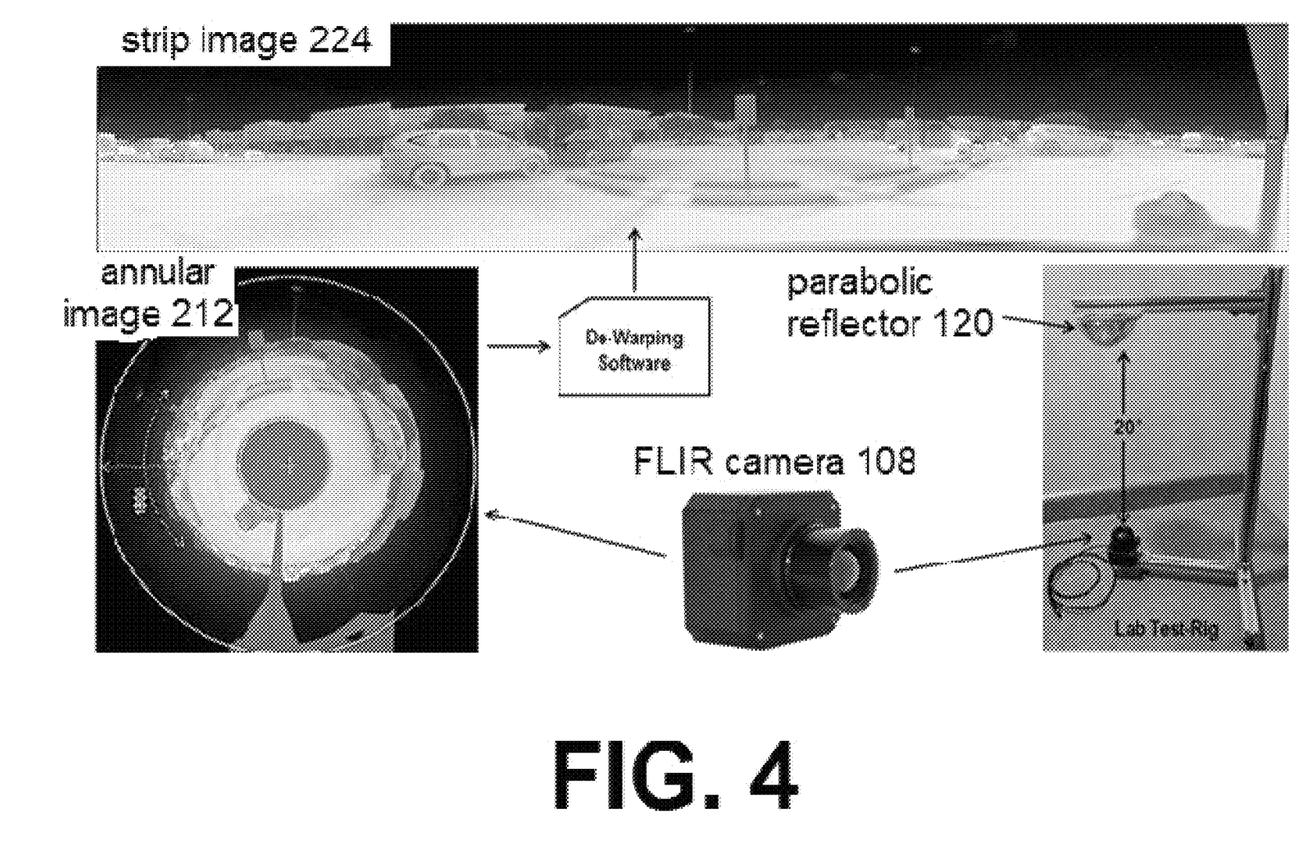
FIG. 4 shows an embodiment of a system with a camera separated from the convex (parabolic) reflector.

FIG. 4 shows an embodiment of a system 100 with a camera 204 separated from the convex reflector 120. The camera 204 can be separated from the convex (parabolic) reflector 120 by various distances, of which one example-only distance is 20".

Figure 5:
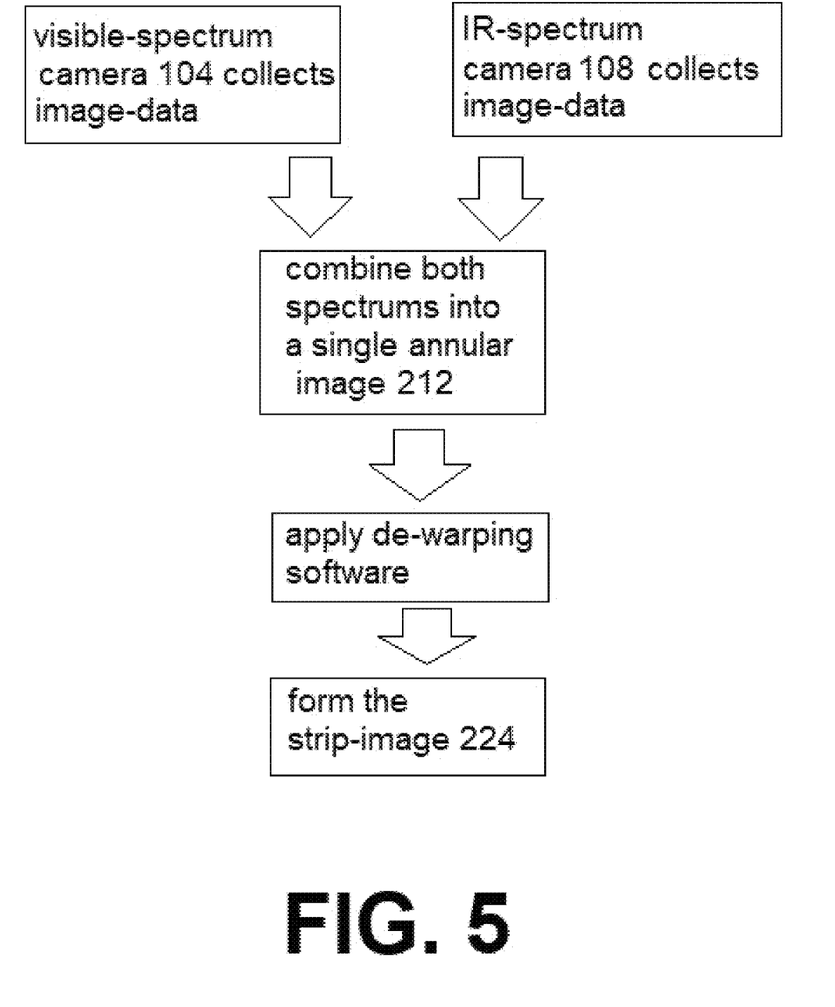
FIG. 5 shows a flowchart for how the elements of FIGS. 1A and 2F work together to process a set of images.

FIG. 5 shows a flowchart for how the elements of FIGS. 1A and 2F work together to process a set of images. The de-warping shown in FIG. 5 can be performed on annular visible spectrum and IR spectrum images either separately, or together. The de-warping software can be embedded onboard of the camera 204, for example in a FPGA (field-programmable gate array) processor. In an embodiment, the visible and thermal images are combined in an AI/ML processor for enhanced object recognition.

The embodiments herein provide panoramic multiple band camera in a low-SWAP (Size, Weight and Power) package integrating high-resolution visible and thermal imagery. The embodiments herein provide continuous 360-degree coverage in both the visible and thermal spectral passbands using one visible camera 104 and one thermal camera 108. What makes the system(s) 100 described herein unique is that the two cameras 104\108 share a single reflective parabolic mirror 120 along an optical path with the same viewing angle (spatial synchronicity). The two focal planes $208_{VIS}$ and $208_{FLIR}$ are then matched pixel-by-pixel to collect image data at the same exact time thus achieving temporal synchronicity.

Example embodiments comprise low-cost multi-band 360-degree situational awareness system(s) 100 for armored vehicles using AI CNN recognition by applying the synchronized visible/thermal video imaging described herein. The ability to identify dual-band, short-lived features generated by the spatial and temporal synchronicity of visible and thermal images enhances the precision of target recognition and hazard/threat detection. FIGS. 3A-3B illustrate this concept.

In this disclosure, a hotspot refers to temperature of an object. Sometimes such hotspots are inside vehicles and can only be viewed from very narrow aspects, which is why the visible and the thermal images need to be exactly aligned with each other. This is an advantage provided by the embodiments herein.

Human bodies, vehicles, and even some associated objects in defined area can produce momentary emissions due to rapidly changing aspects of the objects themselves, or reflected visible and thermal energy from the sun and terrestrial sources of light and heat including weapon detonations. In addition, complex shapes of some types of objects can partially occlude hotspots and other surface features, producing momentary flashes as the objects or the cameras move.

As such, an ability to continuously monitor highly dynamic environments, and do so both in the visible and thermal passbands, greatly enhances effective recognition performance. Further, such monitoring can use convolutional Automatic Target Recognition (ATR) systems which incorporate convolutional neural-networks or other machine vision methods. For example, the synchronous multispectral imaging described herein can determine fuel status of vehicles, or whether a building is or has recently been occupied. Such imaging can also enhance the ability to track ground vehicles based on their thermal trails, can distinguish active versus inactive electronics, and defeat camouflage on personnel and moving vehicles. By harnessing reflective visible and thermal energy, the embodiments herein achieve a more precise situational awareness of a specific region.

The embodiments herein have considerable efficacy and advantages of continuous, spatially and temporally synchronized multiple passband machine vision for military applications. The embodiments herein facilitate collection of spatially and temporally synchronized dual-band imagery for AI training and testing.

In building out and fine-tuning the embodiments herein, specific methods of development, testing, and affirmation comprise at least the following:

Target Study—Based on application we can define a suite of candidate targets and other objects likely to populate scenarios of interest. The physical and radiometric properties of the candidate objects can be defined. It is possible that digital twins of some of these will be available based on the application. This target study is necessary since there is currently insufficient synchronized dual-band imagery available for CNN training and testing.

Illumination Sources—Based on the application we can conduct a review of available spectral measurement of the illuminating sources of visible and thermal radiation, such as self-emissions from targets of interest as well as natural light sources, terrestrial sources of light and heat flashes such as from munition detonations. An important part of this research is to determine the level to which AI recognition systems have the potential to achieve enhanced recognition based on short-lived dual-band phenomena.

Focal Plane Electronics—The thermal and visible images in the dual-band situational awareness system 100 described herein can be synchronized at the video frame level. Significant improvement in object recognition occurs when the synchronization between the visible and thermal focal-plane sampling are performed at the pixel-level. The embodiments herein synchronize an arrangement of detector integration electronics between a visible and thermal focal-plane so that the exact same image elements from both bands are detected absolutely, 100% simultaneously with none of the conventional shift, indeed, no shift at all.

Optics Designs—The ability to miniaturize the optical design depicted in FIG. 1 is limited only by the physical size of the imagers used and the pitch of the focal plane detectors. Variations on the full 360×90 degree panoramic view are also possible depending on the requirements of any specific application.

Firmware—Conversion of the annular image into a rectified strip image 224 is accomplished in a software-based sampling operation limiting the frame rate and/or requiring high performance general purpose processors. Higher video rates of 30-60 FPS are achievable by transferring this software into Field Programmable Gate Array (FPGA) firmware.

In a conventional beam-splitter arrangement, unwanted transmission loss is considered unavoidable, due to geometric special issues. The embodiments herein solve this problem by reflecting essentially 100% of all visible energy off the parabolic mirror 120 onto the visible focal plane $208_{VIS}$. Similarly, essentially 100% of the thermal energy is reflected off the same parabolic mirror 120 onto the thermal focal plane $208_{FLIR}$. The visible light does not impede or interfere with the thermal energy, nor vice-versa. In fact the full spectrum is reflected onto both focal planes $208_{VIS}$-$208_{FLIR}$.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention.

Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of building a dual passband imaging system, comprising:
locating a visible spectrum camera inside a parabolic reflector so as to be looking through a center hole within a flat mirror;
locating a thermal spectrum camera to view the parabolic reflector through the center hole;
arranging the parabolic reflector to direct an exact same image-data toward both the thermal spectrum camera and the visible spectrum camera.

2. The method of claim 1, further comprising:
positioning the visible-spectrum camera for collecting the image-data and generating a first focal plane;
positioning the infrared-spectrum camera for simultaneously collecting the same image-data and generating a second focal plane;
arranging that the first and second focal planes are exactly the same; and
combining both collections of image-data into a single annular image.

3. The method of claim 2, further comprising applying a de-warping software to the combined annular image; and
forming a strip image from the annular image.

4. The method of claim 3, further comprising
applying a de-warping software on only a visible spectrum annular image;
separately applying de-warping software on an IR-spectrum annular image.

5. The method of claim 3, further comprising simultaneously performing the de-warping on the visible spectrum image and the IR-spectrum annular image.

6. The method of claim 4, further comprising
separately locating the de-warping software within the visual-spectrum and IR-spectrum cameras using an embedded onboard module within each type of camera.

7. The method of claim 6, the embedded onboard module comprising an FPGA (field-programmable gate array) processor.

8. The method of claim 2, further comprising:
configuring the system to project multiple spectrums to be simultaneously accessible along the same line of sight.

9. The method of claim 8, further comprising wherein one of the spectrums is in the visible spectrum.

10. The method of claim 8, further comprising wherein one of the spectrums is in the IR spectrum.

11. The method of claim 1, the parabolic reflector further comprising an ambient temperature mirror.

12. The method of claim 1, further comprising:
forming the parabolic reflector from aluminum.

13. The method of claim 1, further comprising:
forming the reflecting mirror parabolic reflector from a chrome-plated substrate.

14. The method of claim 1, further comprising:
forming the reflecting mirror parabolic reflector from a metal-based material that has low emissivity.

15. The method of claim 3, further comprising:
the parabolic reflector causing a change in linear scale in a vertical direction, thereby reducing processing steps in the transformation transforming from the annular image to the strip image.

* * * * *